United States Patent [19]

Latchinian

[11] 4,334,796
[45] Jun. 15, 1982

[54] FURNITURE EDGE ASSEMBLY

[76] Inventor: Jim S. Latchinian, 444 Brickell Ave., Miami, Fla. 33131

[21] Appl. No.: 202,191

[22] Filed: Oct. 30, 1980

[51] Int. Cl.³ ............................ F16D 1/00; F16D 3/00; F16G 11/00
[52] U.S. Cl. ................................... 403/217; 403/231; 403/405; 403/171; 52/288; 52/717; 52/823
[58] Field of Search ............... 403/171, 176, 217, 219, 403/231, 297, 402, 405; 52/280, 288, 716, 717, 823

[56] References Cited

U.S. PATENT DOCUMENTS 2,838,592  6/1958  Feketies ........................... 52/280 X
3,144,265  8/1964  Humble ............................ 403/405 X

FOREIGN PATENT DOCUMENTS 223684  7/1958  Australia .............................. 403/231
2356033  1/1978  France ................................ 403/231
693059  7/1977  U.S.S.R. ............................. 403/219

Primary Examiner—Wayne L. Shedd
Attorney, Agent, or Firm—Oltman and Flynn

[57] ABSTRACT

On an article of furniture an edge assembly is provided which has three edge pieces extending along mutually perpendicular edges of the furniture article forming a corner. Each edge piece in the vicinity of the corner has a pair of generally parallel opposite legs extending inward from an outer wall of the edge piece and defining a recess between them which is open at the inside of the corner. A corner piece presents obliquely disposed legs which extend outward onto the recesses in the edge pieces. The corner pieces present openings in these obliquely disposed legs which receive tapered screws for deforming the corner piece legs into locking engagement with the opposite legs of the respective edge pieces.

18 Claims, 13 Drawing Figures

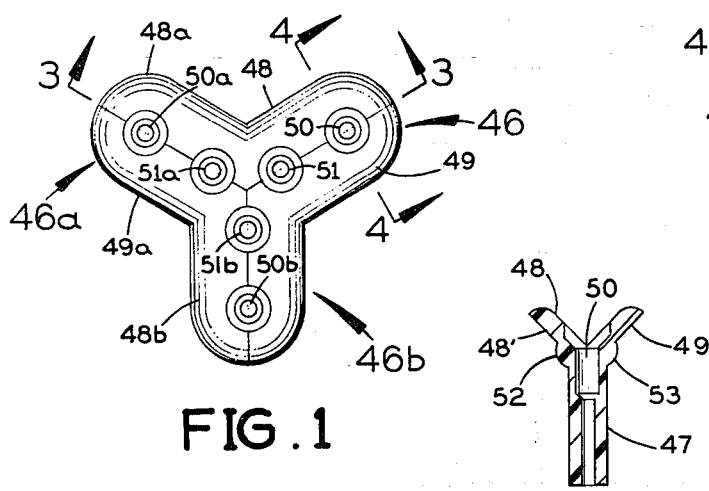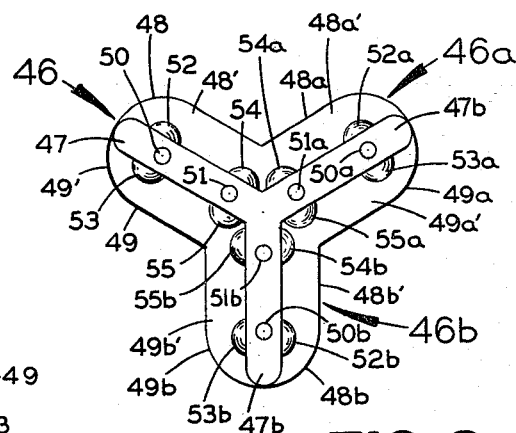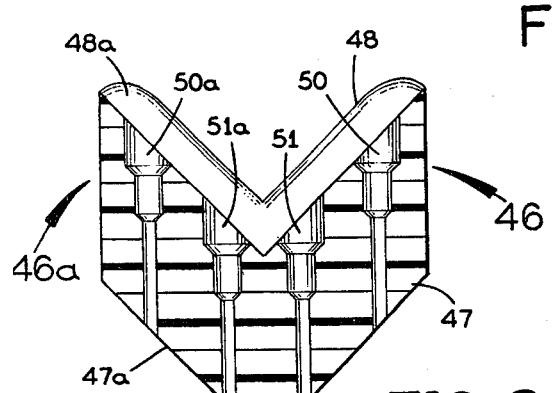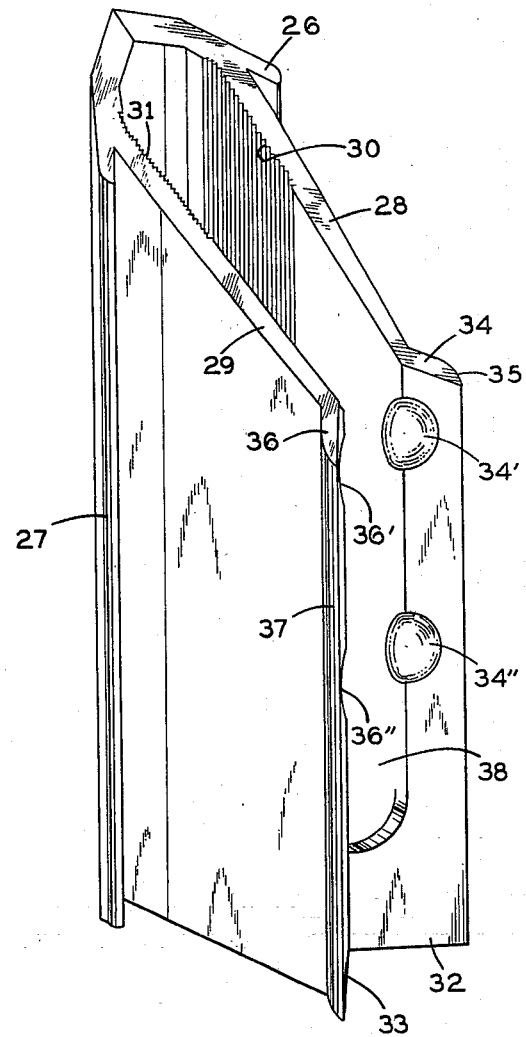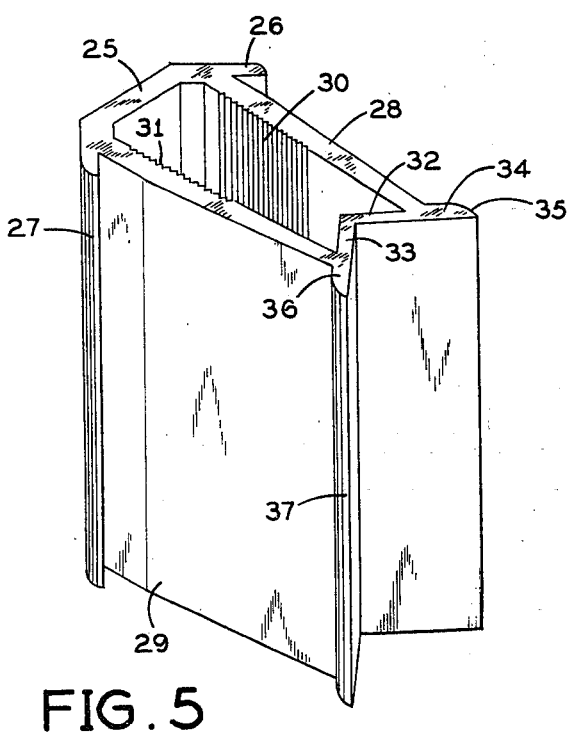

FURNITURE EDGE ASSEMBLY

SUMMARY OF THE INVENTION

This invention relates to an edge assembly for an article of furniture, such as a table, cabinet, wall unit, showcase, or set of bookshelves.

In accordance with the present invention, exposed edges of an article of furniture are covered by edge pieces which are joined to each other and held in place by a corner piece at the inside of a corner of the furniture article. The edge piece and corner piece assembly preferably is part of the structural framework of the furniture article.

A principal object of this invention is to provide a novel and improved edge assembly for an article of furniture.

Another object of this invention is to provide such an edge assembly which may be used on a variety of different furniture articles.

Another object of this invention is to provide a novel assembly which constitutes a protective and decorative edging for an article of furniture as well as part of the structural framework of the furniture article.

Further objects and advantages of this invention will be apparent from the following detailed description of a presently preferred embodiment thereof, shown in the accompanying drawings.

DESCRIPTION OF THE DRAWINGS

FIG. 1 is a top plan view of one of the corner pieces in an edge assembly constructed in accordance with the present invention;

FIG. 2 is a bottom plan view of the same corner piece inverted from the FIG. 1 position;

FIG. 3 is a section taken along the line 3—3 in FIG. 1 through two legs of the corner piece;

FIG. 4 is a cross-section through one leg of the corner piece, taken along the line 4—4 in FIG. 1;

FIG. 5 is a perspective view showing the cross-section of one of the three edge pieces in the present assembly except in the vicinity of the corner;

FIG. 6 is a perspective view of the same edge piece showing its cross-section in the vicinity of the corner;

DETAILED DESCRIPTION

Figure 7:
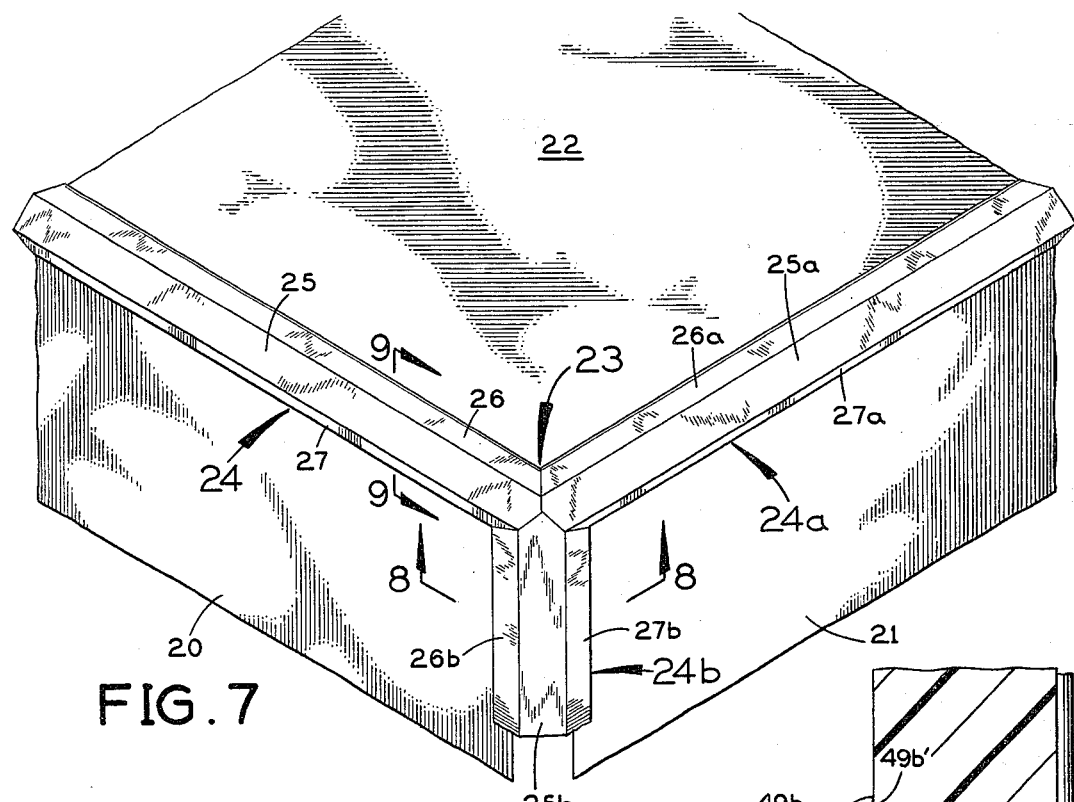
FIG. 7 is a perspective view of part of an article of furniture provided with the present edge assembly along three mutually perpendicular edges which intersect at a corner.

Referring to FIG. 7, the edge assembly of the present invention is shown in place on an article of furniture having flat, perpendicularly disposed, vertical side panels 20 and 21 and a flat, horizontal top panel 22. The three panels meet at a three-edged corner 23.

In accordance with the present invention, the horizontal edge where side panel 20 and top panel 22 adjoin each other is covered by a first edge piece 24 which, in the embodiment shown, presents a flat outer wall 25 extending diagonally at a 45 degree angle between these panels, a top flange 26 which overlies the top panel 22, and a bottom flange 27 which extends down the outside of side panel 20. The horizontal edge where the top panel 22 adjoins the other side panel 21 is similarly covered by a second edge piece 24a, which has a flat outer wall 25a extending diagonally between these panels at a 45 degree angle to each, a top flange 26a overlying the top panel 22, and a bottom flange 27a extending down the outside of side panel 21. The vertical edge where the side panels 20 and 21 adjoin each other is similarly covered by a third edge piece 24b, which has a flat outer wall 25b extending diagonally between these panels at a 45 degree angle to each, a side flange 26b extending down the outside of side panel 20, and a side flange 27b extending down the outside of side panel 21.

The three edge pieces 24, 24a and 24b are of similar construction, the cross-section of which is shown in FIGS. 5 and 6 for the edge piece 24. Each of the edge pieces preferably is an aluminum extrusion.

A first leg 28 of the edge piece 24 extends substantially perpendicular to its outer wall 25 and is joined to the top flange 26 a short distance from the latter's connection to the outer wall 25. A second leg 29 extends almost parallel to the first leg 28 and is joined to the bottom flange 27 a short distance from the latter's connection to the outer wall 25. The two legs 28 and 29 converge slightly in a direction away from the outer wall 25 and they are formed with serrations 30 and 31 on their inside faces. Except in the vicinity of the corner 23 of the article of furniture, the ends of the legs 28 and 29 away from the outer wall 25 are rigidly connected by obliquely disposed segments 32 and 33, which extend parallel to the flanges 26 and 27, respectively, and join each other to form a "V" which is pointed toward the outer wall 25, as best seen in FIG. 5. The connecting segment 32 has an extension 34 which projects laterally outward beyond the leg 28 and presents a flat outer face 35 lying in a plane perpendicular to the plane of the flat outer face of the outer wall 25. Likewise, the connecting segment 33 has an extension 36 which projects laterally outward beyond the leg 29 and presents a flat outer face 37 extending parallel to the outer face 35 on the extension 34 carried by leg 28. As shown in FIG. 6, at its end closest to the corner 23 of the furniture article, the edge piece 24 has the oblique connecting segments 32 and 33 removed, so that in this region the ends of the legs 28 and 29 remote from the outer wall 25 are separated from each other and define a rectangular opening 38 leading into a recess between the legs.

At the juncture between leg 28 and extension 34, the edge piece 24 is formed with a pair of rounded concave depressions 34' and 34". Similarly, the edge piece is formed with a pair of rounded concave depressions 36' and 36" at the juncture between leg 29 and extension 36.

Figure 9:
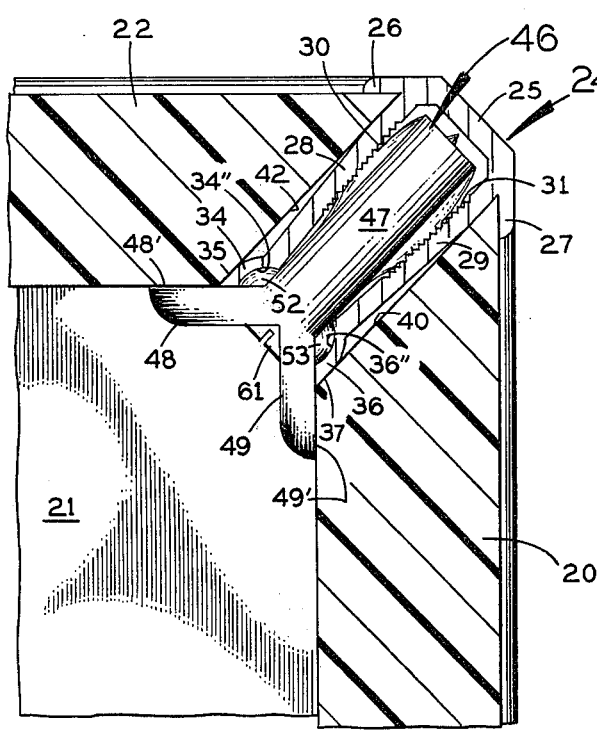
FIG. 9 is a vertical section taken along the line 9—9 in FIG. 7.

FIG. 9 shows how the edge piece 24 fits between the top panel 22 and the side panel 20 in the vicinity of the corner 23 of the furniture article. The top panel 22 is formed with a champfered end surface 42, which extends at 45 degrees downward and inward from its flat, horizontal top face. The side panel 20 has a similar champfered end surface 40 at the top which extends parallel to the champfered surface 42 on the top panel when these two panels are assembled to the edge piece 24. The edge piece 24 is engaged between the champfered surfaces 42 and 40 of the top and side panels 22 and 20, with the extensions 34 and 36 on the inside ends of the edge piece legs 28 and 29 abutting against these champfered surfaces next to the inside faces of these panels, with the flanges 26 and 27 overlapping the outside faces of these panels, and with the outer wall 25 of the edge piece extending across the space between the champfered end surfaces 42 and 40 at the outside of the furniture article.

Figure 10:
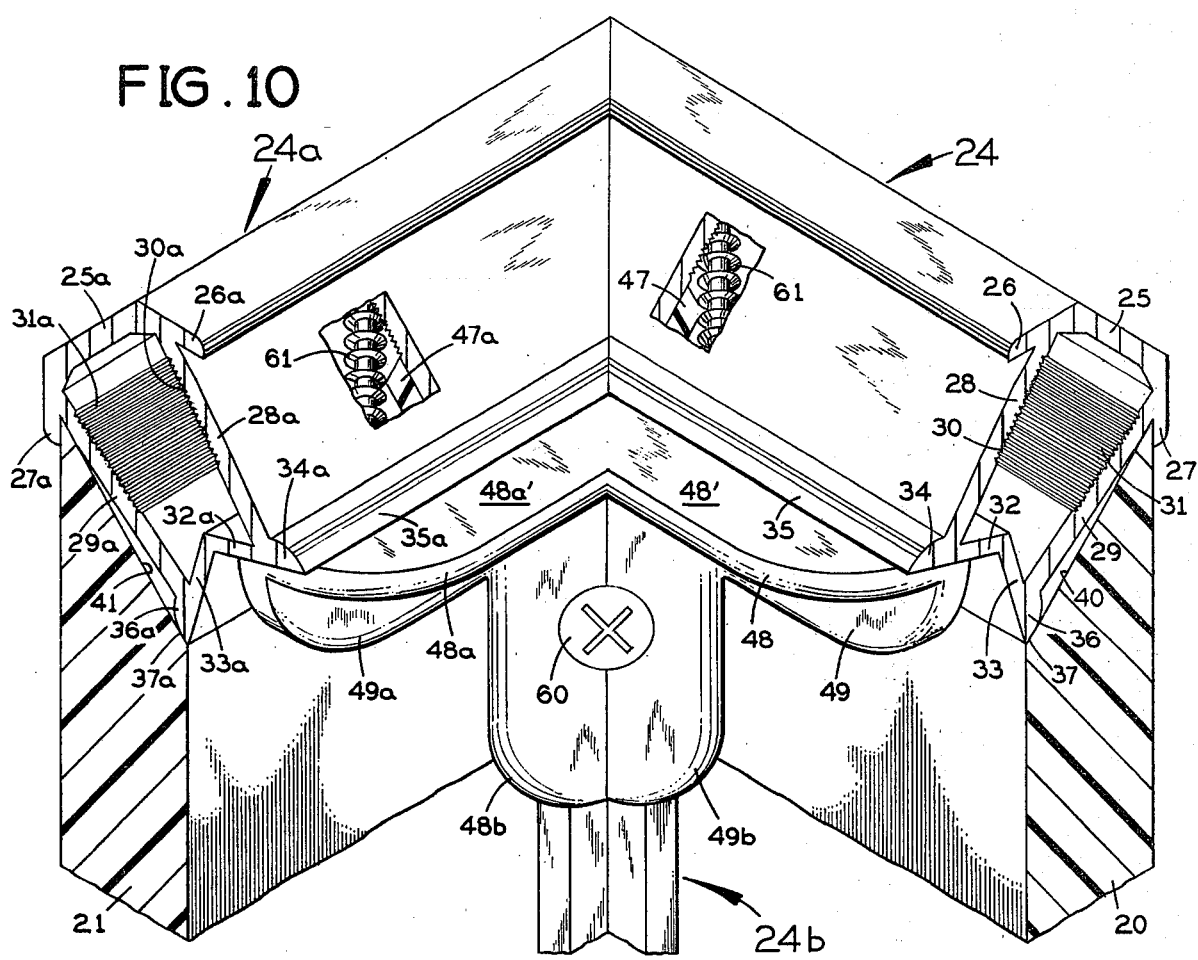
FIG. 10 is a fragmentary perspective view from the inside of the corner of the furniture article having the present edge assembly thereon, with certain parts removed and broken away for clarity.

FIG. 10 shows how the just-described edge piece 24 fits with respect to the adjoining horizontally elongated edge piece 24a, which extends along the edge of the furniture article where the top panel 22 (omitted in FIG. 10) adjoins the side panel 21. Elements of the edge piece 24a which correspond to elements of the first edge piece 24 are given the same reference numerals, but with an "a" suffix added, in FIG. 11 so that detailed description need not be repeated for edge piece 24a. The side panel 21 of the furniture article presents a champfered end surface 41 at the top, which is inclined downward and inward from the outer face of this panel. The leg 29a of the edge piece 24a extends next to surface 41. The top panel 22 presents a champfered end surface which extends parallel to the surface 41 when the edge piece 24a is assembled to panels 21 and 22.

Figure 8:
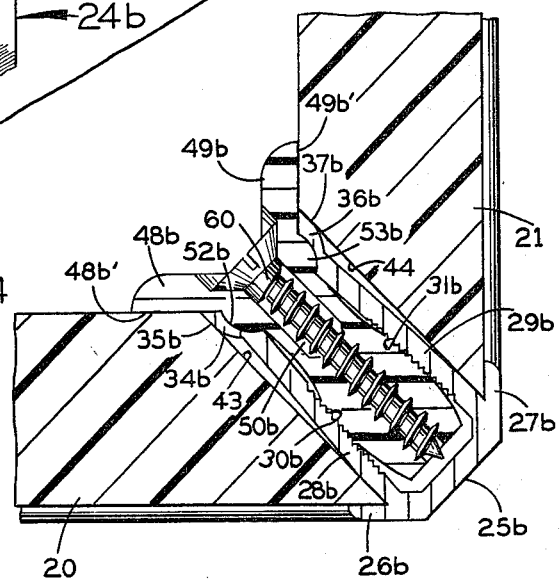
FIG. 8 is a horizontal section taken along the line 8—8 in FIG. 7 at the corner of the article of furniture.

The third edge piece 24b, which extends along the vertical edge of the furniture article between the side panels 20 and 21, is shown in detail in FIG. 8. It is essentially identical to the first edge piece 24. Elements of the edge piece 24b which correspond to those of the edge piece 24 are given the same reference numerals, but with a "b" suffix added. At this vertical edge the side panel 20 terminates in a champfered end surface 43 which extends at a 45 degree angle to its outer face. The other side panel 21 terminates in a similar champfered end surface 44 which extends parallel to surface 43 when the edge piece 24b is assembled to panels 20 and 21.

A corner piece at the inside of the corner 23 of the furniture article holds the three edge pieces 24, 24a and 24b assembled to each other and to the respective panels 20, 21 and 22.

Referring to FIGS. 1-4, the corner piece 45 is a one-piece molded plastic body of generally Y-shaped configuration having three legs 46, 46a and 46b joined at the center of the body and extending away from each other at 120 degree angles, viewed endwise, as shown in FIGS. 1 and 2.

As shown for the leg 46 in FIG. 4, each individual leg of the corner piece is itself Y-shaped, presenting a segment 47 of rectangular cross-section which at the upper end in FIG. 4 is joined to laterally outwardly diverging arms 48 and 49 which extend perpendicular to each other at opposite 45 degree angles to segment 47. A pair of double counter-bored openings 50 and 51 (FIG. 3) are spaced apart along the length of the corner piece leg 46 and extend completely through its rectangular segment 47 as shown in FIGS. 1, 3 and 4. Each of these openings is progressively smaller away from the diverging arms 48 and 49, as shown in FIG. 4.

On the outside of the rectangular segment 47 at its juncture with the arm 48, the corner piece leg 46 is formed with a spherical projection 52 (FIG. 4) at the same location along leg 46 as the larger end of the opening 50. This rounded projection 52 is shaped and dimensioned to be snugly seated in the convex depression 34" (FIG. 6) on the inner end of the corner piece 24. Similarly, on the outside of the rectangular segment 47 at its juncture with arm 49, the corner piece leg 46 is formed with a spherical projection 53 at the same location along leg 46 as the larger end of the opening 50. This projection 53 is shaped and dimensioned to be snugly seated in the rounded depression 36" on the inner end of corner piece 24. Similar spherical projections 54 and 55 are formed on the outside of the corner piece leg 46 at the juncture between its segment 47 and the arms 48 and 49, respectively, at the same location along leg 46 as the larger end of the opening 51. These projections 54 and 55 are shaped, dimensioned and positioned to be seated snugly respectively in the rounded depressions 34' and 36' on the inner end of edge piece 24 when the projections 52 and 53 are seated in the depressions 34" and 36", respectively.

The other two legs 46a and 46b of the corner piece are of identical construction to leg 46. Corresponding elements of these other two legs are given the same reference numerals as those for the elements of leg 46, but with a respective "a" or "b" suffix added.

The arm 48 on one side of leg 46 presents a flat face 48' (FIG. 2) extending laterally outward from the spherical protrusion 52 which is coplanar with a similar face 48a' on the arm 48a of leg 46a, and the arms 48 and 48a may be regarded as forming together a single segment of the corner piece. The same is true of the arm 49 on leg 46 and the arm 49b on leg 46b of the corner piece, which present coplanar faces 49' and 49b' (FIG. 2). It is also true of the arm 49a on leg 46a and the arm 48b on leg 46b of the corner piece, which present coplanar faces 49a' and 48b'. At the coplanar faces 48' and 48a' of the segment formed by the adjoining arms 48 and 48a, and at the coplanar faces 49a' and 48b' of the segment formed by the adjoining arms 49a and 48b, and at the coplanar faces 49b' and 49' of the segment formed by the adjoining arms 49b and 49, each of these segments of the corner piece extends perpendicular to the other two.

The rectangular segment 47 on leg 46 of the corner piece is slidably insertable into the opening 38 (FIG. 6) between the legs 28 and 29 of the first edge piece 24 from the inside of the corner 23 of the article of furniture to the fully inserted position shown in FIGS. 9 and 10. The rounded projections 52, 53, 54 and 55 on this leg of the corner piece are seated in the depressions 34", 36", 34' and 36' on the inner end of the edge piece 24 to position this leg of the corner piece at the desired location along the edge piece 24. The flat face 48' of the arm 48 on corner piece 46 engages the end face of the extension 34 on the inner end of the corner piece leg 28 and the bottom face of the top panel 22. The flat face 49' of the arm 49 on corner piece 46 engages the end face of the extension 36 on the inner end of the corner piece leg 29 and the inside face of the side panel 20.

In this same position of the corner piece, the rectangular segment 47a of its leg 46a is slidably received in the opening between the legs 28a and 29a of the second horizontal edge piece 24a, as shown in FIG. 10. The rounded projections 52a, 53a, 54a and 55a on this leg of the corner piece are seated in corresponding depressions on the inner end of the edge piece 24a. The flat face 48a' of the arm 48a on this corner piece leg engages the end face of the extension 34a on the inner end of leg 28a of edge piece 24a and the bottom face of the top panel 22 of the furniture article. The flat face 49a' of the arm 49a on this leg of the corner piece abuts against the inside face of the side panel 21 and the end face of the extension 36a on the inner end of leg 29a of edge piece 24a.

Also, in this position of the corner piece the rectangular segment 47b of its leg 46b is slidably received in the opening between the legs 28b and 29b of the verticle edge piece 24b, as shown in FIG. 8. The rounded projections 52b, 53b, 54b and 55b on this leg of the corner piece are seated in corresponding depressions on the inner end of the edge piece 24b. The flat face 48b' of the arm 48b on this corner piece leg engages the end face of the extension 34b on the inner end of leg 28b of edge piece 24b and the inside face of the side panel 20 of the article of furniture. The flat face 49b' of the arm 49b on this corner piece leg engages the end face of the extension 36b on the inner end of leg 29b of edge piece 24b and the inside face of the side panel 21 of the furniture article.

It will be evident from FIG. 10 that the inside face of the top panel 22 of the article of furniture is engaged by the coplanar faces 48' and 48a' of the adjoining arms 48 and 48a of the corner piece. Similarly, the inside face of the side panel 20 is engaged by the coplanar faces 48b' and 49' of the adjoining arms 48b and 49 of the corner piece. Also, the inside face of the other side panel 21 is engaged by the coplanar faces 49a' and 48b' of the adjoining corner piece arms 49a and 48b.

A tapered wood screw is inserted into each of the six openings 50, 51, 50a, 51a, 50b and 51b in the corner piece to lock the respective rectangular segments 47, 47a and 48b of the three corner piece legs in the respective edge pieces 24, 24a and 24b. This is shown in detail in FIG. 8 for a screw 60 inserted into the opening 50b in leg 46b of the corner pieces. As shown in that Figure, when the screw 60 is fully inserted, it spreads apart the rectangular segment 47b around this opening and deforms the material of this segment laterally outward into tight engagement with the legs 28b and 29b of the edge piece 24b. The teeth 30b and 31b on these edge piece legs bite into the plastic material of the corner piece segment 47b to lock it in place. The head of the screw 60 seats in the outer end of the opening 50b in the corner piece and holds the arms 48b and 49b against the inside faces of the side panels 20 and 21.

The same action takes place at each of the other screws inserted into a corresponding opening in the corner piece. FIG. 9 illustrates the deformation of the originally rectangular segment 47 of the corner piece leg 46 as a result of the insertion of the corresponding screw 61.

Thus each of the three legs 46, 46a and 46b of the corner piece is held in the corresponding edge piece 24, 24a and 24b by two screws, received in the respective pairs of openings 50 and 51, 50a and 51a, and 50b and 51b in the corner piece. The slidable insertion of the corner piece from the inside of the corner 23 of the article of furniture is readily accomplished with the aid of the rounded projections on the corner piece which fit into the complementary depressions on the inner ends of the edge pieces to locate the corner piece properly with respect to these edge pieces. The insertion of the six screws completes the assembly of the corner piece, the three edge pieces and the three panels of the furniture article into a rigid unitary structure. Preferably, the edge pieces 24, 24a and 24b and the corner piece, assembled as shown and described, are part of the structural framework of the article of furniture.

Figure 11:
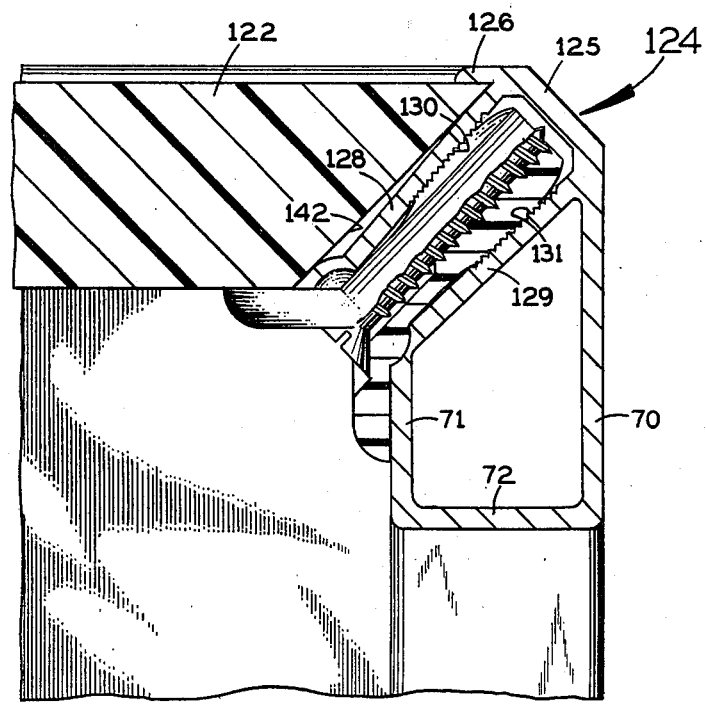
FIG. 11 is a view similar to FIG. 9 showing a modified edge assembly on a different furniture article than the one shown in FIG. 7.

FIG. 11 shows a modification of the invention in which one of the edge pieces is formed integral with a hollow structural part of the article of furniture. This hollow structural part may, for example, be on the front of a cabinet or wall unit, or it may be part of a frame for a small table. Elements of the FIG. 11 arrangement which correspond to elements of the embodiment shown in FIGS. 1–10 are given the same reference numerals plus 100, and these elements need not be described again. The oblique wall 129 on the edge piece 124 is joined to an outer wall 70 which extends vertically down from its outer end. An inner wall 71 extends down from the inner end of wall 129, and a horizontal bottom wall 72 joins the outer and inner walls 70 and 71. The article of furniture does not have a side panel on the side where the hollow structural part 70, 71, 72, 129 is located. Except for this change, the embodiment of FIG. 11 is essentially the same as the embodiment of FIGS. 1–10.

Figure 12:
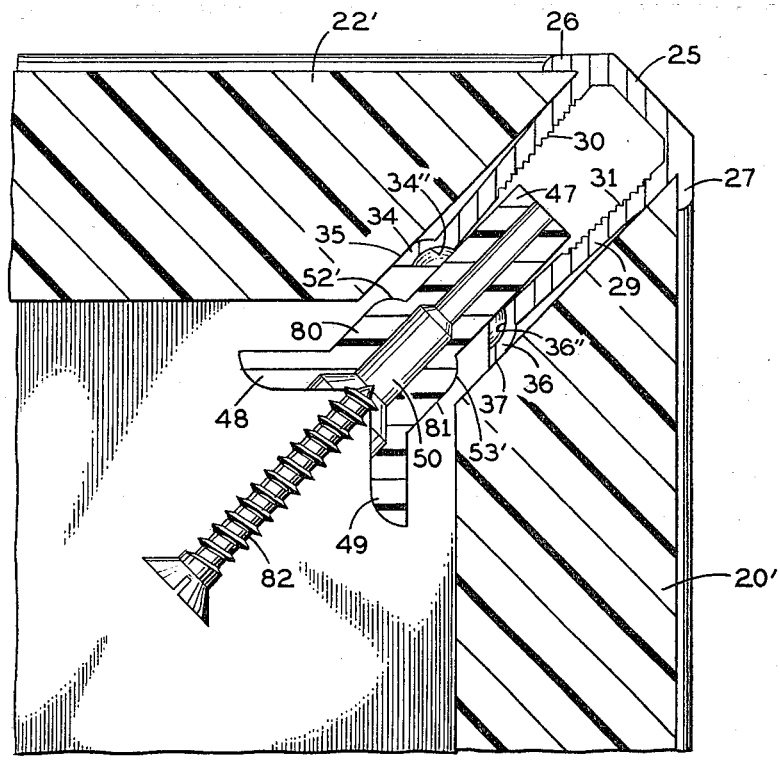
FIG. 12 is a view similar to FIG. 9 of a further modification, with the parts of the edge assembly shown before they are fully assembled.
Figure 13:
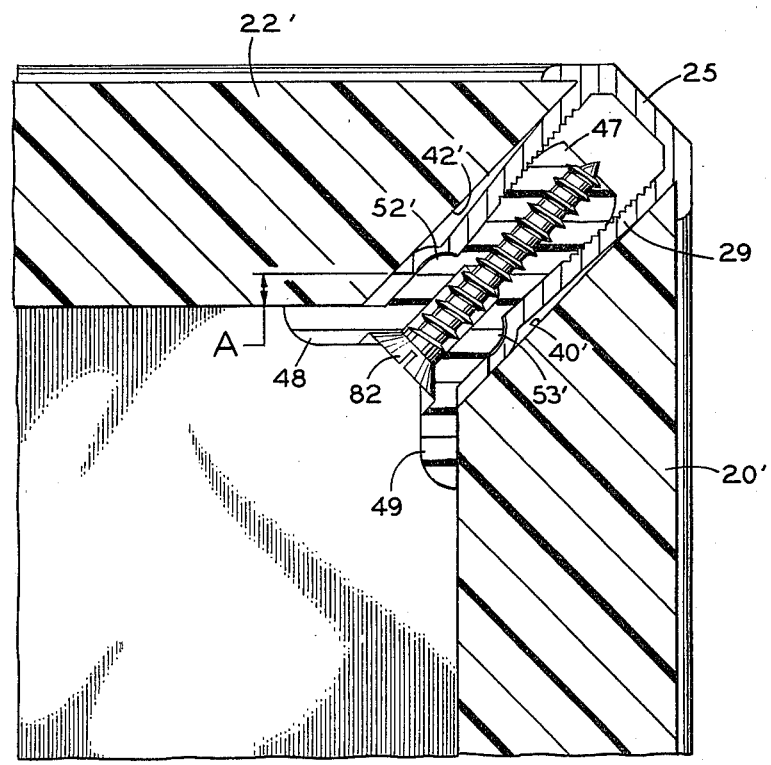
FIG. 13 is a similar view of the same edge assembly in its fully assembled position.

FIGS. 12 and 13 show another modification in which the three edge pieces are the same size as in FIGS. 1–10 but the panels of the article of furniture are substantially thicker. As shown in FIG. 13, the top panel 22' is so thick that when its outside face is next to the flange 26 on the edge piece 24, its inside face is well beyond the lateral extension 34 on the inner end of the edge piece leg 28. This is also true of the thicker side panel 20' in relation to the extension 36 on the inner end of the opposite leg 29 of the edge piece.

To accommodate the increased panel thickness, the corner piece has each of its three legs lengthened from the rounded protrusions which become seated in the rounded depressions on the inner ends of the edge pieces. In FIG. 12 this lengthening is provided by an external rib 80, which extends from the rounded protrusion 52' to the arm 48 on the inner end of the corner piece, and by an external rib 81 on the opposite side, which extends between the rounded protrusion 53' and the arm 49 on the inner end of the corner piece at this opposite side. As shown in FIG. 13, when the rounded protrusions 52' and 53' on this leg of the corner piece are seated in the corresponding depressions 34" and 36" on the inner end of the edge piece, the arms 48 and 49 on the corner piece engage the inside faces of panels 22' and 20', respectively.

As shown in FIG. 13, the insertion of the screw 82 into the opening 50' in the corner piece leg 46 causes the inserted, normally rectangular segment 47 of this corner piece to be deformed laterally outward into locking engagement with the teeth 30 and 31 on the inside of the legs 28 and 29 of the edge piece 24. Also, the head of this screw holds the arms 48 and 49 on the inner end of this corner piece against the inside faces of panels 22' and 20'. The same action takes place at the other opening in the corner piece leg 46 where a similar screw is inserted, as well as at the two openings in each of the other legs of the corner piece, each of which receives a tapered screw in the same manner.

From the foregoing, it will be evident that the present invention constitutes a novel and convenient way of providing protective and decorative edging on an article of furniture, with the edge pieces held together against adjoining panels of the furniture article by a readily insertable corner piece. Preferably, the edge pieces and corner pieces also are part of the structural framework of the furniture article.

With the present edge assembly, the article of furniture can be shipped in a disassembled "knocked-down" condition at a very substantial saving in freight cost. The knocked-down article of furniture can be readily assembled by an unskilled person in a relatively short time because of the novel and convenient manner in which the present edge assembly may be completed, as described. When the edge pieces of the present edge assembly are in place they protect the edges of the furniture article against damage, as well as enhancing the decorative beauty of the furniture article. An edge piece which requires replacement can be removed simply by unscrewing the two screws holding it assembled at the respective corners of the furniture article where the opposite ends of the edge piece are located. Consequently, a furniture article having one or more damaged edge pieces can be rejuvenated simply by replacing the damaged edge pieces, which can be done by an unskilled person, such as the owner of the furniture article. Also, the panels (e.g. 20, 21 and 22) of the furniture article are readily replaceable in the event that wear-and-tear or changing fashions make such replacement desirable.

I claim:

1. An edge assembly for an article of furniture having three mutually transverse edges adjoining each other at a corner, said edge assembly comprising:
   three edge pieces respectively extending along the edges of the furniture article which form said corner;
   each of said edge pieces in the vicinity of said corner having a spaced pair of opposite legs extending generally parallel to each other diagonally inward from the corresponding edge of the article of furniture and separated from each other at the inside of said corner, said pair of legs defining a recess which is open at the inside of said corner;
   a unitary corner piece having three obliquely disposed legs which adjoin each other at their inner ends and extend outward snugly into said recesses in said edge pieces, said corner piece at each of said legs having at least one hole therein which is open at the inner end of the respective leg;
   and fastener members insertable into said holes in said legs of the corner piece to force said legs of the corner piece into locking engagement with said opposite legs of the respective edge pieces.

2. An edge assembly according to claim 1, wherein said corner piece is a molded one-piece body formed with said three obliquely disposed legs.

3. An edge assembly according to claim 1, wherein said fastener members are tapered screws.

4. An edge assembly according to claim 1, wherein said edge piece legs are serrated on the inside for gripping said obliquely disposed legs of the corner piece.

5. An edge assembly according to claim 1, wherein each of said edge pieces is a metal extrusion and said corner piece is of plastic material.

6. An edge assembly according to claim 1, wherein each of said edge pieces comprises:
   an outer wall extending transversely across the said opposite legs at their outer ends;
   and inner wall means extending between said opposite legs at their inner ends except in the vicinity of said corner of the furniture article to rigidify the edge piece.

7. An edge assembly according to claim 1, wherein each edge piece at its inner end on opposite sides of said recess therein and each of said obliquely disposed legs of the corner piece have complementary depressions and projections for snug interfitting engagement to locate the corner piece on the edge pieces.

8. An edge assembly according to claim 7, wherein said depressions are in the edge pieces and said projections are on the corner piece.

9. An edge assembly according to claim 1, wherein:
   said corner piece comprises three additional segments adjoining each other in mutually perpendicular relationship at the inner ends of said obliquely disposed legs, said obliquely disposed legs extending from the respective junctures between said additional segments outward into said recesses between the opposite legs of the edge pieces.

10. An edge assembly according to claim 9, wherein said corner piece unit is a molded one-piece body formed with said three obliquely disposed legs and said three additional segments.

11. An assembly according to claim 9, wherein:
    each of said edge pieces has depressions therein at the inner ends of its opposite legs on opposite sides of said recess therein;
    and said corner piece has projections thereon at the respective junctures between its obliquely disposed legs and said additional segments, said projections being shaped, dimensioned and positioned for snug reception in said depressions on the edge pieces to locate the corner piece with respect to the edge pieces when said obliquely disposed legs of the corner piece are received in said recesses between said opposite legs of the respective edge pieces.

12. An edge assembly according to claim 11, wherein said opposite legs of the edge pieces are serrated on the inside for gripping said obliquely disposed legs of the corner piece.

13. An edge assembly according to claim 12, wherein each of said edge pieces is a metal extrusion and said corner piece is a one-piece molded plastic body.

14. An edge assembly according to claim 13, wherein each of said fastener members is a tapered screw.

15. An edge assembly according to claim 13, wherein each of said edge pieces comprises:
    an outer wall extending transversely across said opposite legs at their outer ends;
    and inner wall means extending between said opposite legs at their inner ends except in the vicinity of said corner of the furniture article to rigidify the edge piece.

16. An edge assembly according to claim 9, wherein each of said edge pieces is a metal extrusion and said corner piece is a one-piece molded plastic body.

17. An edge assembly according to claim 16, wherein:
    each of said edge pieces has depressions therein at the inner ends of its opposite legs on opposite sides of said recess therein;
    and said corner piece has projections thereon at the respective junctures between its obliquely disposed legs and said additional segments, said projections being shaped, dimensioned and positioned for snug reception in said depressions on the edge pieces to locate the corner piece with respect to the edge pieces when said obliquely disposed legs of the corner piece are received in said recesses between said opposite legs of the respective edge pieces.

18. An edge assembly according to claim 17, wherein said opposite legs of the edge pieces are serrated on the inside for gripping said obliquely disposed legs of the corner piece.

* * * * *